United States Patent
Sundkvist

(10) Patent No.: US 6,383,255 B1
(45) Date of Patent: May 7, 2002

(54) METHOD FOR RECOVERING THE VALUABLE METAL CONTENT OF A SULPHURIC ACID LEACHING SOLUTION

(75) Inventor: Jan-Eric Sundkvist, Skellefteå (SE)

(73) Assignee: Boliden Mineral AB (SE)

( * ) Notice: Subject to any disclaimer, the term of this patent is extended or adjusted under 35 U.S.C. 154(b) by 0 days.

(21) Appl. No.: 09/580,121

(22) Filed: May 30, 2000

(30) Foreign Application Priority Data

Jun. 22, 1999 (SE) ............................................. 9902366

(51) Int. Cl.[7] ................................................. C22B 3/44
(52) U.S. Cl. ........................... 75/739; 75/741; 205/367; 205/589; 205/607
(58) Field of Search ........................ 75/711, 742, 739; 205/367, 589, 607

(56) References Cited

U.S. PATENT DOCUMENTS

| | | | |
|---|---|---|---|
| 2,686,114 A | * | 8/1954 | McGauley et al. |
| 3,787,301 A | | 1/1974 | Bozec et al. |
| 4,066,520 A | * | 1/1978 | Emmett, Jr. et al. ......... 204/108 |
| 4,244,734 A | * | 1/1981 | Reynolds et al. ............. 75/724 |
| 5,616,168 A | * | 4/1997 | Gabb et al. ................... 75/718 |
| 5,622,615 A | * | 4/1997 | Young et al. ................. 205/582 |
| 6,245,125 B1 | * | 6/2001 | Dew et al. .................... 75/743 |

FOREIGN PATENT DOCUMENTS

AU  B-11201/92 B  9/1992
WO  WO 94/28184  12/1994

* cited by examiner

*Primary Examiner*—Roy King
*Assistant Examiner*—Tima McGuthry-Banks
(74) *Attorney, Agent, or Firm*—Burns, Doane, Swecker, & Mathis, L.L.P.

(57) ABSTRACT

A method for winning the valuable metal content of a leaching solution acidified with sulphuric acid, by solvent extraction and electrowinning and a following final product winning stage, for instance an electrowinning stage, wherein the pH of the leaching solution is raised successively to precipitate out the iron and arsenic present in a first precipitation stage, removing said first precipitate, and precipitating the valuable metal content of the leaching solution substantially totally in a following precipitation stage. The resultant precipitate containing valuable metal and gypsum is removed and leached in an acid environment to re-dissolve the valuable metal content, and the thus formed acid solution and its metal content are delivered to a solvent extraction circuit in which the metal content is converted to a substantial degree to an acid electrolyte from which metal or some other end product is won. The acid solution deplete of valuable metal and deriving from the solvent extraction stage can be returned to the stage in which the valuable metal content is re-dissolved and, when electrowinning is used for winning the end product, electrolyte deplete of valuable metal can be cycled from the electrowinning stage to the solvent extraction circuit.

21 Claims, 1 Drawing Sheet

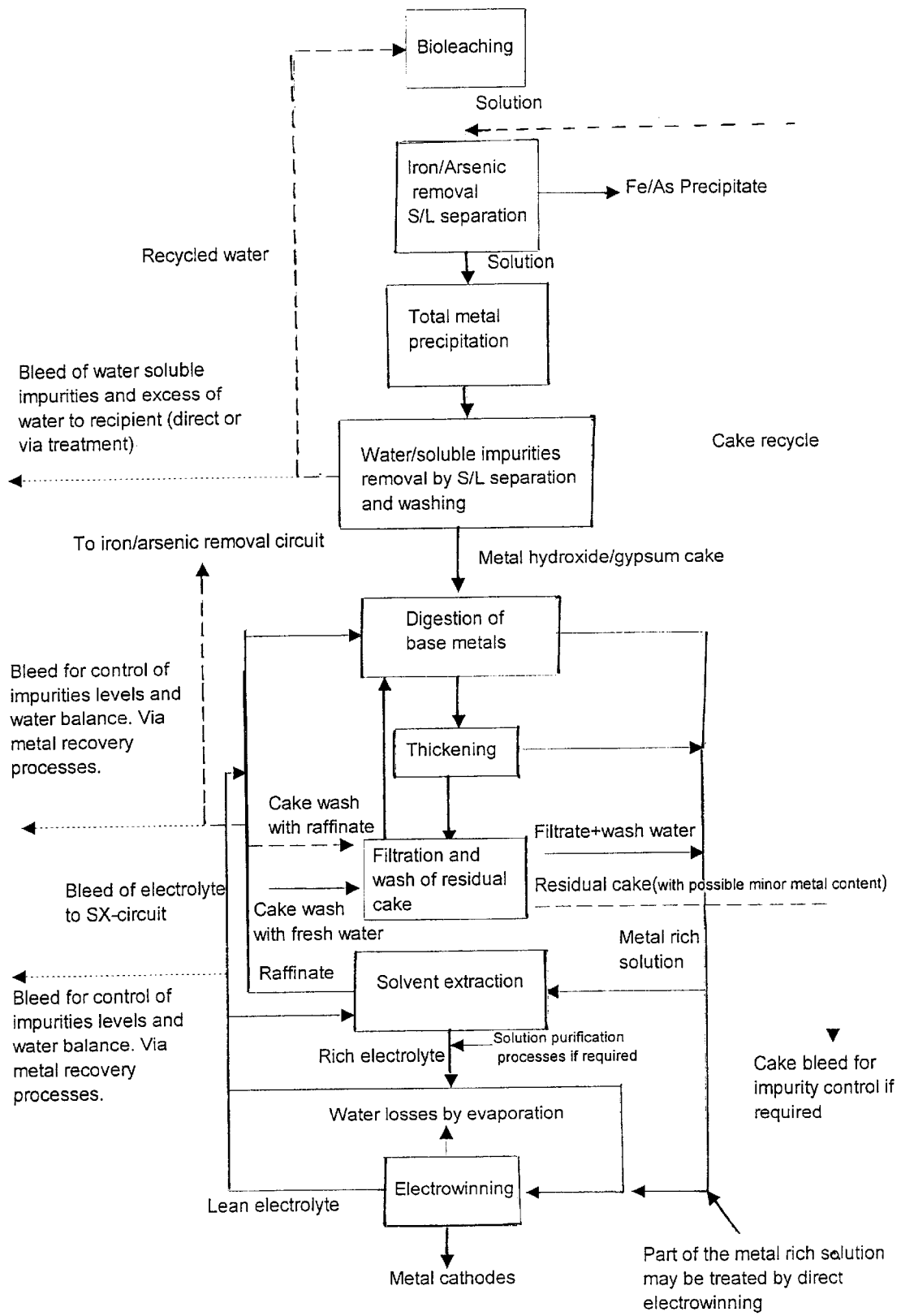

METHOD FOR RECOVERING THE VALUABLE METAL CONTENT OF A SULPHURIC ACID LEACHING SOLUTION

BACKGROUND OF THE INVENTION

The present invention relates to a method for winning the valuable metal content of a leaching solution acidified with sulphuric acid, by solvent extraction and a following final product winning stage, for instance an electro-winning stage. The invention is particularly suitable for application in bioleaching processes, and is adapted thereto, although the invention is not limited to use in conjunction with such processes.

In respect of bioleaching processes for winning valuable metals, such as zinc, nickel and cobalt, from ores or concentrates and other materials that contain valuable metals for instance, it has been proposed in the literature that metal is won from the leaching solution deriving from a bioleaching process, which is an acid leaching process in the presence of bacteria, with the aid of solvent extraction and electrowinning. Bioleaching is described more generally in our earlier patent publications U.S. Pat. No. 5,397,380 and SE-A-9901613-1 and also in WO 9216667 for instance, which deals generally with the oxidation of metal sulphide material with bacteria, and in WO 94/28184 which relates to the bioleaching of zinc concentrate.

An article written by A. P. Briggs et al (Int. Biohydrometallurgy Symposium IBS97, Sydney 1997) describes a bacteria leaching process in Uganda for winning cobalt from roasted pyrites, where the cobalt content is won by solvent extraction followed by electrowinning (SX-EW).'

Another article written by M. L. Steemson et al and included in the same publication (IBS97) describes a bioleaching process for treatment of zinc concentrate, where the zinc is won by solvent extraction followed by electrowinning (SX-EW). A similar process is also described in AU-B-673927.

A common feature of these earlier proposed methods which include a solvent extraction electrowinning stage (SX-EW) is that solvent extraction is performed on the leaching solution subsequent to precipitating out the iron present therein. One drawback with these proposed methods is that a major part of the leaching solution taken from the solvent extraction stage and depleted of valuable metals, this solution normally being referred to as a raffinate, must be returned to the bioleaching stage in order to avoid the release of metals to the recipient, and therewith also reduce unnecessary valuable metal losses. Alternatively, the valuable metal concentration of the so-called raffinate must be very low, namely a low content that is made possible to obtain solely by part-processes and thus with multi-stage extraction. The drawbacks of such a process will be clearly apparent, both from the aspect of apparatus and from the aspect of the work required. In addition, recycling of the raffinate to the various part-process stages is complicated process-wise and the effect of the process is difficult to oversee and control. A significant question is what happens to the activity of the bacteria cultures in the bioleaching circuits. There can occur in the reactors in the bioleaching stage an acid surplus that requires the addition of large quantities of lime or limestone to neutralise the acid, this addition causing, in turn, problems with respect to the viscosity of the pulp in the circuits due to the resultant precipitation of gypsum. So-called "surplus water" must also be removed from the solvent extraction stage together with the raffinate, and because it has been in contact with the organic extraction agent utilised as a binding medium between the incoming liquid phase rich in metals and the incoming metal-lean liquid phase, it will contain relatively significant quantities of said binding medium, for instance. Normally, this amount is about 100 ppm organic phase in the raffinate in the case of heap leaching.

It has now been found possible to provide a method for winning the valuable metal content of a leaching solution acidified with sulphuric acid, by solvent extraction followed by a final product winning stage, for instance an electro-winning stage, with which the aforedescribed drawbacks are eliminated at least substantially, and with which a more readily controlled and flexible process is obtained. The inventive method comprises the steps, or stages, set forth in the accompanying Claims.

BRIEF DESCRIPTION OF THE FIGURE

FIG. 1 is a schematic, plan view of a preferred process of winning a valuable metal content of a leaching solution containing iron and/or arsenic and acidified with sulphuric acid.

DESCRIPTION OF THE INVENTION

According to the method, the pH of the leaching solution is thus raised successively in a first precipitation stage to precipitate out the iron and arsenic present, wherein the precipitate obtained in this first stage is removed and an essentially total precipitation of the valuable metal content of the leaching solution is effected in a following precipitation stage. The precipitate containing valuable metals and gypsum formed in said following stage is removed and leached in an acid. environment to re-dissolve the valuable metal content. The resultant acid solution is passed together with its metal content to a solvent extraction circuit where said metal content is converted into an acid metal-rich solution to a substantial extent, from which metal is won by electrowinning or some other known process for winning a metal-containing end product. Although electro-winning is the method most used at present to win metals from acid metal-rich solutions, there may be local reasons why some other analog metal product winning process should be chosen. For instance, cementation of iron scrap has earlier been used for metal winning purposes, and such a process may conceivably be used within the scope of the present invention without deviating from the inventive concept. Another alternative is simply to vaporise the pure metal-rich acid solution obtained in the solvent extraction process and therewith produce copper sulphate, for instance.

An acid solution depleted of valuable metal and derived from the solvent extraction circuit is suitably returned to the stage in which the valuable metal content is re-dissolved and, when electrowinning is chosen, the electrolyte depleted of valuable metal is returned suitably from the electrowinning stage to the solvent extraction circuit.

The solution separated from the valuable metal/gypsum precipitate is suitably taken out as a bleed after removing any possible contaminant content of the solution. Part of the metal content obtained from the precipitate containing valuable metal and gypsum in the re-dissolving process can be passed directly to the electrowinning stage if so desired.

The introduction of a total precipitation stage in the process after an iron precipitation stage results, in principle, in three dissolution circuits, therewith eliminating the need to recycle raffinate to the bioleaching circuit. A significant part of the filtrate obtained in the total precipitation process can then be recycled over the bioleaching circuit or some other oxidation process.

The metal/gypsum precipitate is thus leached in the raffinate obtained in the solvent extraction stage and the liquid flow is adapted so that extraction can be effected as effectively as possible and preferably so as to obviate the need for intermediate neutralising stages.

The inventive method is particularly beneficial for winning the valuable metal content of a leaching solution obtained in a bioleaching process, among other things because the bioleaching stages need not receive the raffinate from the solvent extraction stage, since the method includes three separate dissolution circuits as mentioned above, wherewith the filtrate obtained from the total precipitation of valuable metal content can be recycled to a large extent over the bioleaching circuit, as will be described in more detail herebelow.

The invention will now be described and explained in more detail with reference to a schematic flow diagram which illustrates a preferred embodiment of the invention as applied in context, where the final products of the process are metal cathodes.

It will be seen from the flow diagram that the process is, in principle, divided into three dissolution circuits, namely a first circuit from bioleaching to and including phase separation and washing of the metal hydroxide/gypsum cake precipitate, a second circuit from and including the metal digestion stage up to and including the inlet circuit in the solvent extraction stage, and a third circuit from and including the outlet circuit in the solvent extraction stage up to and including the final product winning stage, which in the illustrated case is an electro-winning stage.

The leaching solution obtained from the bioleaching stage is purified in the first circuit, by precipitating its iron and arsenic content, and an Fe/As gypsum precipitate is removed from the circuit. The metal content of the remaining solution is precipitated out by neutralisation, separated and washed, and the liquid phase recycled to the bioleaching process, although a minor part of the liquid phase may be removed for bleeding-off water-soluble contaminants such as Mg and any surplus water in the circuit. The washed precipitate from the first circuit is a metal hydroxide/gypsum cake which is passed to the first stage in the second circuit.

In the second circuit, the metal content of said metal hydroxide/gypsum cake is first dissolved and the remaining part of the cake is thickened, filtered and washed and can then be removed from the process. The cake is dissolved with an acid solution, in this case with the recycled so-called raffinate as will be evident from the following, and the resultant metal-rich acid solution is passed to the input circuit of a solvent extraction reactor, where the metal content is converted substantially totally to an incoming metal-lean solution via an organic extraction phase. The metal-lean solution (the so-called raffinate) leaving the solvent extraction stage is recycled to the first stage in the second circuit, namely the metal dissolving stage, and constitutes at least part of the acid solution for re-dissolving said metal content. Part of the raffinate can be passed to the filtering stage in said second circuit.

The metal-rich solution arriving from the solvent extraction stage and formed by metals converted via said organic extraction phase is led to an electrowinning stage as electrolyte. Thus, in the third circuit the metal-rich solution from the solvent extraction stage is delivered to an electrowinning cell and metal is precipitated onto cathodes in said cell. A minor part of the metal-rich solution from the digestion stage of the second circuit may also be passed to the electrowinning cell for direct electrowinning. Any impurities of solvent residues in the rich electrolyte can be removed in separate processes prior to the electrolyte being passed to the electrowinning process. The solution depleted of metal by metal precipitation in the electro-winning process is recycled to the solvent extraction stage on the one hand and also to the second dissolution circuit for handling the acid requirement of said solution on the other hand. Part of this solution may also be recycled internally within the third dissolution circuit.

The inventive method has several advantages over known methods or processes for winning metals from acid leaching solution, for instance minimum recycling of contaminants that can jeopardise the activity in a bacterial process a large number of possible outlets for contaminants, through which such contaminants can be removed from the system in an optimal fashion minimum water consumption simple control of water and acid balances a relatively constant composition of incoming material to the solvent extraction/electrowinning stage is obtained regardless of the content levels of incoming metal material. The composition is influenced solely by changes in the content ratio between different metals. The total content (molar) of valuable metals is relatively constant.

minimum amounts of solvent extraction reagents in removed residual products and solutions.

What is claimed is:

1. A method of winning a valuable metal content of a leaching solution containing iron and/or arsenic and acidified with sulphuric acid, by solvent extraction and a following final product winning stage, comprising:

successively raising the pH of the leaching solution to precipitate the iron and/or arsenic present in a first precipitation stage, removing said first precipitate, and precipitating substantially all of the valuable metal content of the leaching solution in a second precipitation stage; removing the second precipitate containing the valuable metal content;

leaching said second precipitate in an acid environment to re-dissolve the valuable metal content, thereby forming an acid solution containing the valuable metal content;

passing the thus formed acid solution containing the valuable metal content to a solvent extraction circuit in which substantially all of the valuable metal content is converted to an acid metal-rich solution, and wherein an acid solution depleted of the valuable metal content is formed;

passing the metal-rich solution to the final product winning stage to win a valuable metal or some other desired end product.

2. A method according to claim 1, further comprising returning the acid solution depleted of the valuable metal content from the solvent extraction unit to the stage in which the valuable metal content is re-dissolved.

3. A method according to claim 2, in which a metal is won as an end product by electrowinning, further comprising returning a valuable metal depleted electrolyte from the electrowinning stage to the solvent extraction circuit.

4. A method according to claim 3, further comprising taking out a solution removed from the second precipitate stage as a bleed subsequent to removing any contaminant content.

5. A method according to claim 4, further comprising taking out the acid solution depleted of the valuable metal content from the solvent extraction circuit as a bleed.

6. A method according to claim 5, further comprising passing a part of the acid solution containing the valuable metal content directly to the electrowinning stage.

7. The method according to claim 6, wherein the leaching solution is derived from a bioleaching process.

8. A method according to claim 1, in which a metal is won as an end product by electrowinning, further comprising returning a valuable metal depleted electrolyte from the electrowinning stage to the solvent extraction circuit.

9. A method according to claim 8, further comprising taking out a solution removed from the second precipitate stage as a bleed subsequent to removing any contaminant content.

10. A method according to claim 2, further comprising taking out a solution removed from the second precipitate stage as a bleed subsequent to removing any contaminant content.

11. A method according to claim 1, further comprising taking out a solution removed from the second precipitate stage as a bleed subsequent to removing any contaminant content.

12. A method according to claim 9, further comprising taking out the acid solution depleted of the valuable metal content from the solvent extraction circuit as a bleed.

13. A method according to claim 3, further comprising taking out the acid solution depleted of the valuable metal content from the solvent extraction circuit as a bleed.

14. A method according to claim 2, further comprising taking out the acid solution depleted of the valuable metal content from the solvent extraction circuit as a bleed.

15. A method according to claim 1, further comprising taking out the acid solution depleted of the valuable metal content from the solvent extraction circuit as a bleed.

16. The method according to claim 1, wherein the second precipitate contains gypsum.

17. The method according to claim 1, wherein the pH of the leaching solution is successively raised to precipitate substantially all of the valuable metal content of the leaching solution in the second precipitation stage.

18. A method of winning a valuable metal content of a leaching solution containing iron and/or arsenic and acidified with sulphuric acid, by solvent extraction and a following final product winning stage, comprising:
successively raising the pH of the leaching solution to precipitate the iron and/or arsenic present in a first precipitation stage, removing said first precipitate, and precipitating substantially all of the valuable metal content of the leaching solution in a second precipitation stage; removing the second precipitate containing the valuable metal content;
leaching said second precipitate in an acid environment to re-dissolve the valuable metal content, thereby forming an acid solution containing the valuable metal content;
passing the thus formed acid solution containing the valuable metal content to a solvent extraction circuit in which substantially all of the valuable metal content is converted to an acid metal-rich solution, and wherein an acid solution depleted of the valuable metal content is formed;
passing the metal-rich solution to the final product winning stage to win a valuable metal or some other desired end product, and further comprising
taking out a solution removed from the second precipitate stage as a bleed subsequent to removing any contaminant content, and
passing a part of the acid solution containing the valuable metal content directly to an electrowinning stage.

19. A method of winning a valuable metal content of a leaching solution containing iron and/or arsenic and acidified with sulphuric acid, by solvent extraction and a following final product winning stage, comprising:
successively raising the pH of the leaching solution to precipitate the iron and/or arsenic present in a first precipitation stage, removing said first precipitate, and precipitating substantially all of the valuable metal content of the leaching solution in a second precipitation stage; removing the second precipitate containing the valuable metal content;
leaching said second precipitate in an acid environment to re-dissolve the valuable metal content, thereby forming an acid solution containing the valuable metal content;
passing the thus formed acid solution containing the valuable metal content to a solvent extraction circuit in which substantially all of the valuable metal content is converted to an acid metal-rich solution, and wherein an acid solution depleted of the valuable metal content is formed;
passing the metal-rich solution to the final product winning stage to win a valuable metal or some other desired end product, wherein a metal is won as an end product by electrowinning, and further comprising
returning a valuable metal depleted electrolyte from the electrowinning stage to the solvent extraction circuit, and
passing a part of the acid solution containing the valuable metal content directly to the electrowinning stage.

20. A method of winning a valuable metal content of a leaching solution containing iron and/or arsenic and acidified with sulphuric acid, by solvent extraction and a following final product winning stage, comprising:
successively raising the pH of the leaching solution to precipitate the iron and/or arsenic present in a first precipitation stage, removing said first precipitate, and precipitating substantially all of the valuable metal content of the leaching solution in a second precipitation stage; removing the second precipitate containing the valuable metal content;
leaching said second precipitate in an acid environment to re-dissolve the valuable metal content, thereby forming an acid solution containing the valuable metal content;
passing the thus formed acid solution containing the valuable metal content to a solvent extraction circuit in which substantially all of the valuable metal content is converted to an acid metal-rich solution, and wherein an acid solution depleted of the valuable metal content is formed;
passing the metal-rich solution to the final product winning stage to win a valuable metal or some other desired end product, and further comprising
returning the acid solution depleted of the valuable metal content from the solvent extraction unit to the stage in which the valuable metal content is re-dissolved; and
passing a part of the acid solution containing the valuable metal content directly to an electrowinning stage.

21. A method of winning a valuable metal content of a leaching solution containing iron and/or arsenic and acidified with sulphuric acid, by solvent extraction and a following final product winning stage, comprising:
successively raising the pH of the leaching solution to precipitate the iron and/or arsenic present in a first precipitation stage, removing said first precipitate, and precipitating substantially all of the valuable metal content of the leaching solution in a second precipitation stage; removing the second precipitate containing the valuable metal content;

leaching said second precipitate in an acid environment to re-dissolve the valuable metal content, thereby forming an acid solution containing the valuable metal content;

passing the thus formed acid solution containing the valuable metal content to a solvent extraction circuit in which substantially all of the valuable metal content is converted to an acid metal-rich solution, and wherein an acid solution depleted of the valuable metal content is formed;

passing the metal-rich solution to the final product winning stage to win a valuable metal or some other desired end product, and further comprising passing a part of the acid solution containing the valuable metal content directly to an electrowinning stage.

* * * * *